United States Patent
Kiraly et al.

(10) Patent No.: US 7,599,535 B2
(45) Date of Patent: Oct. 6, 2009

(54) SYSTEM AND METHOD FOR TREE-MODEL VISUALIZATION FOR PULMONARY EMBOLISM DETECTION

(75) Inventors: Atilla Peter Kiraly, Plainsboro, NJ (US); Carol L. Novak, Newtown, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 894 days.

(21) Appl. No.: 11/194,252

(22) Filed: Aug. 1, 2005

(65) Prior Publication Data
US 2006/0023925 A1 Feb. 2, 2006

Related U.S. Application Data

(60) Provisional application No. 60/598,098, filed on Aug. 2, 2004.

(51) Int. Cl.
*G06K 9/00* (2006.01)
(52) U.S. Cl. .............. 382/128; 382/130; 382/131; 382/240; 382/226; 600/410
(58) Field of Classification Search ........... 382/100, 382/128, 130, 131, 132, 133, 165, 240; 600/407, 600/410; 250/363.02, 363.01
See application file for complete search history.

(56) References Cited

U.S. PATENT DOCUMENTS 7,113,623 B2 * 9/2006 Chen et al. ............ 382/128
7,356,367 B2 * 4/2008 Liang et al. ............ 600/407
2003/0007002 A1 1/2003 Hida et al.
2005/0100208 A1 * 5/2005 Suzuki et al. ............ 382/157

OTHER PUBLICATIONS

Masutani et al., "Computer Detection of Plumonary Embolism in Spiral CT Angiography Based on Volumetric Image Analysis", published Dec. 2002 ("Masutani").*
Kiraly A. P. et al., "Analysis of branching tubular structures in 3d digital images," *Proceedings 2002 International Conference on Image Processing*, Sep. 22, 2002 vol. 2:3 pp. 333-336.
Kiraly A. P. et al. "3D Human Airway Segmentation for Virtual Bronchoscopy" *Proceedings of the SPIE*, vol. 4683, 2002, pp. 16-29 XP002248659 abstract.
E. Pichon, et al., "A novel method for pulmonary emboli visualization from high-resolution CT images," *Proceedings of the SPIE*, vol. 5367, May 2004, pp. 161-170 XP002355834 Abstract.
Hoffmann t. et al.; "An optimization approach to unsupervised hierarchical texture segmentation," *Image Processing* Oct. 1997, vol. 3, pp. 213-216 XP010253710, abstract.
International Search Report.

* cited by examiner

*Primary Examiner*—Vikkram Bali
*Assistant Examiner*—Ali Bayat

(57) ABSTRACT

A system and method for tree-model visualization for detecting an abnormality in an anatomical tree structure are provided. The method comprises: fitting a tree-model to an anatomical tree structure; converting branches of the tree-model into first two-dimensional branch images; and arranging the first two-dimensional branch images in a hierarchical order to form a second two-dimensional image.

19 Claims, 7 Drawing Sheets

(a)

SYSTEM AND METHOD FOR TREE-MODEL VISUALIZATION FOR PULMONARY EMBOLISM DETECTION

CROSS-REFERENCE TO RELATED APPLICATION

This application claims the benefit of U.S. Provisional Application No. 60/598,098, filed Aug. 2, 2004, a copy of which is herein incorporated by reference.

BACKGROUND OF THE INVENTION

1. Technical Field

The present invention relates to visualization and computer aided diagnosis and detection of pulmonary embolism, and more particularly, to a system and method for tree-model visualization for pulmonary embolism detection.

2. Discussion of the Related Art

A pulmonary embolism (PE) occurs when a piece of a blood clot from a deep vein thrombosis (DVT) breaks off and travels to an artery in a lung where it blocks the artery, damages the lung and puts a strain on the heart. This short-term complication is potentially life threatening and occurs in about ten percent of patients with acute DVT events. It may be even more common than generally realized because the majority of embolisms occur without symptoms.

Although PE is one of the most common causes of unexpected death in the United States, it may also be one of the most preventable. Prompt treatment with anticoagulants is essential to prevent loss of life. However, such treatment carries risks, thus making correct diagnosis critical. As a result, computed tomography angiography (CTA) is gaining increasing acceptance as a method of diagnosis by offering sensitivity and specificity comparable or superior to alternative methods such as pulmonary angiography and ventilation-perfusion scans.

Images acquired from 16-slice computed tomography (CT) scanners used during CTA provide very high-resolution data allowing for enhanced detection of emboli located in sub-segmental arteries. Analysis of the high-resolution data via two-dimensional (2D) slices involves tracking individual vessels and examining their contents. This analysis, however, can be time consuming, especially for peripheral arteries. For example, a medical practitioner such as a radiologist must navigate through individual 2D slices while at the same time remembering the locations of the vessels being tracked. However, because the radiologist can only track a limited number of vessels at one time, the entire tracking process must be repeated.

Current research in the area of automated analysis of PE within contrast-enhanced CT images concerns either the direct detection of clots within the arteries by means of computer aided detection (CAD) or the indirect inference of clot location by visualization of the vessels or perfusion defects in affected lung areas. When detecting clots within the arteries using CAD, a good segmentation of the arteries is generally required to detect precise locations of PE. Once the PE candidates are automatically identified, they are presented to a radiologist for verification. Since PE CAD candidates are automatically identified, some PE locations may be missed and false positives may occur. In addition, the radiologist is typically given no information as to why a particular PE location was chosen or not.

In another method for PE visualization, the mean density of local areas of the lungs is computed and rendered to directly visualize perfusion defects. Lung areas showing lower than average density are typically suggestive of an upstream clot; however, other conditions such as emphysema may also result in below average intensity. This method involves similar navigational requirements to that of 2D slice viewing, namely, scrolling through 2D slice sections and remembering the locations of certain patterns.

In yet another PE visualization method, a shaded three-dimensional (3D) vessel tree uses internal density regions of the vessels to color the tree surface. This method simplifies the search for peripheral PE because vessel tracking is no longer necessary. However, the visualized tree must be navigated in 3D, and because branches tend to occlude other branches, navigation around the tree requires a significant amount of interaction. In addition, the entire surface of each branch may need to be examined, thus requiring a full rotational view of each branch resulting in a time-consuming process.

Accordingly, there is a need for a technique that reduces or eliminates the need for 3D navigation for viewing all structures of a 3D vessel tree.

SUMMARY OF THE INVENTION

The present invention overcomes the foregoing and other problems encountered in the known teachings by providing a system and method for tree-model visualization for pulmonary embolism detection.

In one embodiment of the present invention, a method for tree-model visualization for detecting an abnormality in an anatomical tree structure, comprises: fitting a tree-model to an anatomical tree structure; converting branches of the tree-model into first two-dimensional branch images; and arranging the first two-dimensional branch images in a hierarchical order to form a second two-dimensional image.

The anatomical tree structure is segmented by using one of a thresholding and size-based labeling, line-filter based or structure tensor-based segmentation technique.

The step of fitting the tree-model comprises: defining a root site for the anatomical tree structure; computing a skeleton of the segmented anatomical tree structure; forming a raw tree-structure using the skeleton; eliminating false branches in the raw tree-structure; smoothing and centering the skeleton; and assigning direction vectors to points in the segmented anatomical tree structure.

The tree-model may also be fit by using one of a vessel-based tracking technique, skeletonization, distance transform or level-set based tree-model computation technique. The branches of the tree-model are converted into the first two-dimensional branch images by using one of an unrolling, side-by-side display, rotating structure or two-dimensional maximum intensity projection technique.

The anatomical tree structure is one of a vessel tree such as a blood vessel tree or airway tree such as a bronchial tree. The anatomical tree structure is acquired using one of a computed tomography or magnetic resonance imaging technique. The abnormality is one of a pulmonary embolism, airway stenosis or brain aneurysm.

In another embodiment of the present invention, a method for analyzing two-dimensional tree images to detect an abnormality in an anatomical tree structure, comprises: fitting a tree-model to an anatomical tree structure; converting each branch of the tree-model into a two-dimensional branch image to form a plurality of two-dimensional branch images; and arranging the two-dimensional branch images in a hierarchical order to form a two-dimensional presentation image.

The step of fitting the tree-model comprises: defining a root site for the anatomical tree structure; computing a skeleton of the segmented anatomical tree structure; forming a raw tree-structure using the skeleton; eliminating false branches in the raw tree-structure; smoothing and centering the skeleton; and assigning direction vectors to points in the segmented anatomical tree structure.

The method further comprises: presenting the two-dimensional presentation image; observing branches in the two-dimensional presentation image in a hierarchical order; receiving a branch selection; and obtaining an original axial view of image data of the branch or three-dimensional rendering of the branch. When the selected branch includes an abnormality, the abnormality is one of a pulmonary embolism, airway stenosis or brain aneurysm.

In yet another embodiment of the present invention, a system for tree-model visualization for detecting an abnormality in an anatomical tree structure, comprises: a memory device for storing a program; a processor in communication with the memory device, the processor operative with the program to: fit a tree-model to an anatomical tree structure; convert branches of the tree-model into first two-dimensional branch images; and arrange the first two-dimensional branch images in a hierarchical order to form a second two-dimensional image.

The anatomical tree structure is segmented using one of a thresholding and size-based labeling, line-filter based or structure tensor-based segmentation technique.

The processor is operative with the program code, when fitting, to: define a root site for the anatomical tree structure; compute a skeleton of the segmented anatomical tree structure; form a raw tree-structure using the skeleton; eliminate false branches in the raw tree-structure; smooth and center the skeleton; and assign direction vectors to points in the segmented anatomical tree structure.

The tree-model may also be fit by using one of a vessel-based tracking technique, skeletonization, distance transform or level-set based tree-model computation technique. The branches of the tree-model are converted into the first two-dimensional branch images by using one of an unrolling, side-by-side display, rotating structure or two-dimensional maximum intensity projection technique.

The anatomical tree structure is one of a vessel tree or airway tree. The anatomical tree structure is acquired using one of a computed tomography or magnetic resonance imaging device. The abnormality is one of a pulmonary embolism, airway stenosis or brain aneurysm.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
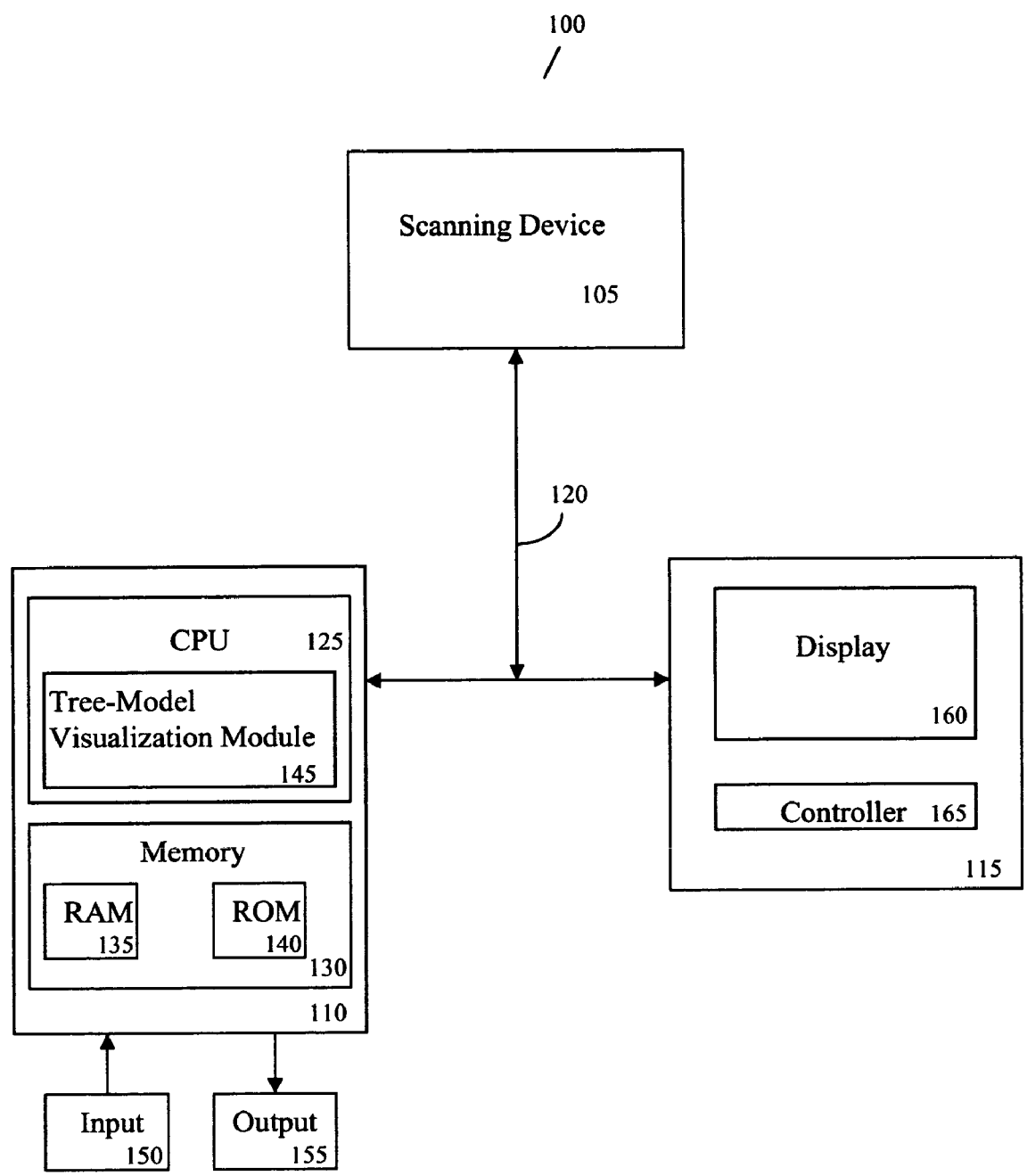
FIG. 1 is a block diagram of a system for tree-model visualization for pulmonary embolism detection according to an exemplary embodiment of the present invention.

FIG. 1 is a block diagram of a system 100 for tree-model visualization for pulmonary embolism detection according to an exemplary embodiment of the present invention.

As shown in FIG. 1, the system 100 includes, inter alia, a scanning device 105, a personal computer (PC) 110 and an operator's console 115 connected over, for example, an Ethernet network 120. The scanning device 105 may be a magnetic resonance (MR) imaging device, a CT imaging device, a helical CT device, a positron emission tomography (PET) device, a 2D or 3D fluoroscopic imaging device, a 2D, 3D, or four-dimensional (4D) ultrasound imaging device, or an x-ray device. The scanning device 105 may also be a hybrid-imaging device capable of CT, MR, PET or other imaging techniques.

The PC 110, which may be a workstation, portable or laptop computer, a personal digital assistant (PDA), etc., includes a central processing unit (CPU) 125 and a memory 130, which are connected to an input 150 and an output 155. The CPU 125 includes a tree-model visualization module 145 that includes one or more methods for tree-model visualization for pulmonary embolism detection.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, or printer.

The operation of the system 100 is controlled from the operator's console 115, which includes a controller 165, for example, a keyboard, and a display 160, for example, a CRT display. The operator's console 115 communicates with the PC 110 and the scanning device 105 so that 2D image data collected by the scanning device 105 can be rendered into 3D data by the PC 110 and viewed on the display 160. It is to be understood that the PC 110 can be configured to operate and display information provided by the scanning device 105 absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. The PC 110 may also include an image rendering system/tool/application for processing digital image data of an acquired image dataset to generate and display 2D and/or 3D images.

As shown in FIG. 1, the tree-model visualization module 145 may also be used by the PC 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Figure 2:
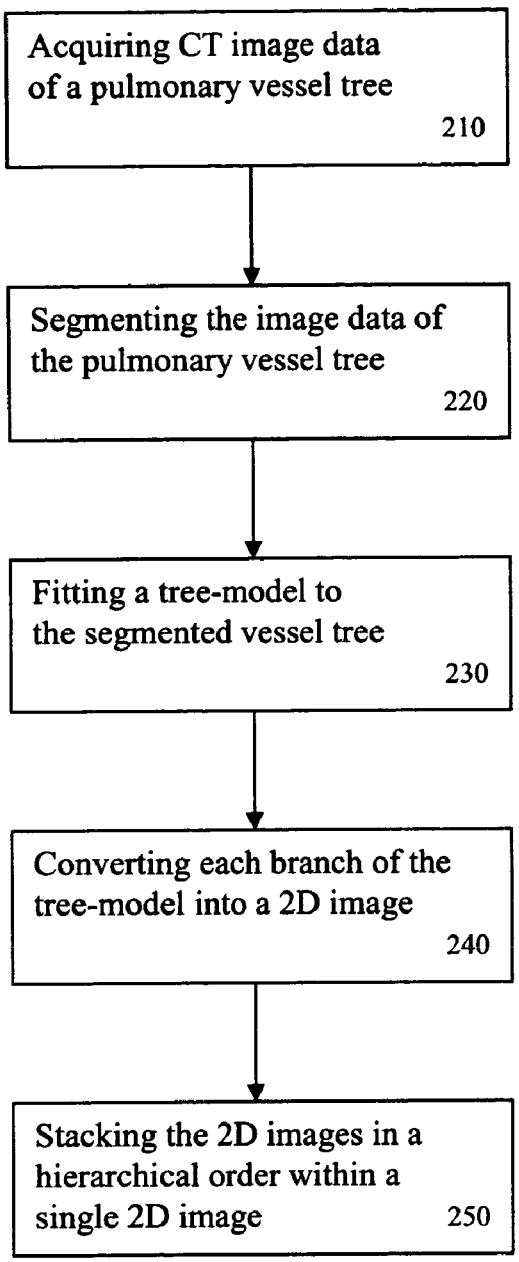
FIG. 2 is a flowchart illustrating a method for tree-model visualization for pulmonary embolism detection according to an exemplary embodiment of the present invention.

FIG. 2 is a flowchart showing an operation of a method for tree-model visualization for pulmonary embolism detection according to an exemplary embodiment of the present invention.

As shown in FIG. 2, CT image data of a pulmonary vessel tree is acquired from a pair of lungs inside a patient (210). This is accomplished by using the scanning device 105, in this example a CT scanner, which is operated at the operator's console 115, to scan the patient's chest or lungs thereby generating a series of 2D image slices associated with the lungs. The 2D image slices of the lungs are then combined to form a 3D image of the pulmonary vessel tree. In addition to the lungs, it is to be understood that the CT image data can be acquired from any one of a leg, arm, brain or other body part containing branching blood vessels or airways. Further, other types of data such as MR image data may be used in accordance with the present invention.

After the CT image data of the pulmonary vessel tree is acquired, the vessel tree is segmented (220). It is to be understood that the vessel segmentation can be accomplished by using any suitable vessel segmentation method. For example, vessel segmentation techniques such as thresholding and size-based labeling, line-filter based or structure tensor-based segmentations may be used. It should also be understood that any method for obtaining a tree-model for vessels could be used with the present invention. This includes, for example, vessel-tracking methods that do not require vessel segmentation and when using such methods, steps 220 and 230 (discussed below) are not required. In such methods, the tree-model is obtained directly from the original image. For completeness, a vessel segmentation method for use with the present invention will now be discussed.

First, a mask of the patient's lungs is created via a high-threshold region growing from a seed point in the trachea. A dilation followed by erosion is then performed on the segmented vessel tree to fill empty spaces caused by vessels. It is to be understood that the erosion operator is slightly larger than the dilation operator to prevent the ribs and other structures near the chest wall from being included in the mask. Lung vessels are then segmented by including all voxels above a threshold value within the lung mask. The threshold may be set so that it is low enough to capture both contrast-filled and non-contrast filled blood vessels, including those that are fully occluded by emboli.

Figure 4:
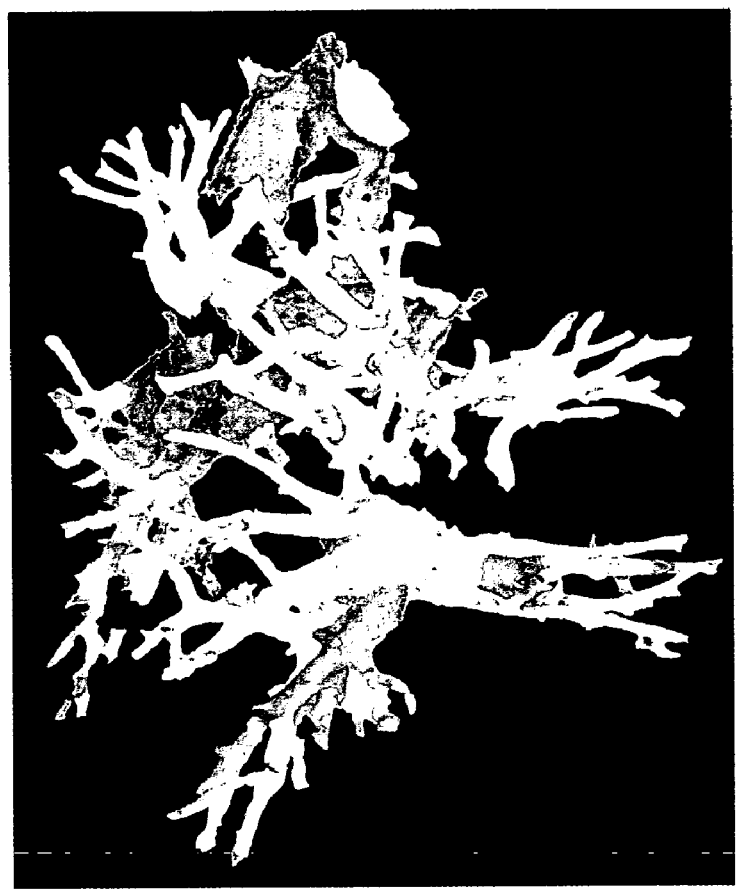
FIG. 4 is an image illustrating a 3D visualization of a pulmonary vessel tree segmented according to a conventional technique.

An example of the rendered segmentation just discussed is shown in image (a) of FIG. 4. In this image, in addition to illustrating the segmentation model, the surface is shaded by the inner contents. This image is also taken from a view of a shaded 3D vessel tree. A further example of the rendered segmentation is shown in image (a) of FIG. 5 where the dark circular region 510 on the right branch signifies a PE.

Given the segmentation, a tree-model is then fit to the segmented image (230). It is to be understood that a variety of methods for fitting a tree-model to the segmented image can be used in this step. In addition, algorithm methods based on vessel tracking can be used to fit, or in other words, obtain a tree-model. One tree-fitting model for use with the present invention is discussed in, A. P. Kiraly, et al., "Three-Dimensional Path Planning for Virtual Bronchoscopy," IEEE Transactions on Medical Imaging, Vol. 23, No. 11, pp 1365-1379, November 2004, a copy of which is herein incorporated by reference. An example of the tree-fitting model discussed therein will be now be discussed with reference to FIG. 3.

Figure 3:
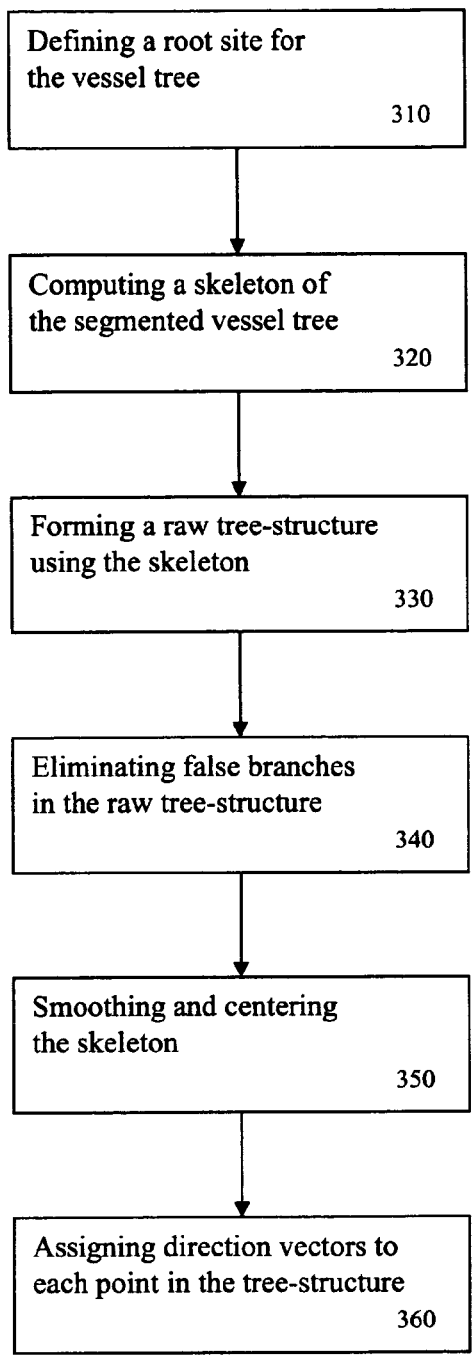
FIG. 3 is a flowchart illustrating a method for tree-model fitting for use with an exemplary embodiment of the present invention.

As shown in FIG. 3, tree computation begins with the skeletonization of previously segmented vessels and proceeds through several steps. First, a root site, $r_A$, is defined for the root of the tree (310). The skeleton of the segmented image is computed using distance transforms to capture endpoints followed by homotopy-preserving voxel elimination for thinning (320). Next, a raw tree structure is formed using the skeleton, although it may contain false branches (330). The tree structure and the segmented image are then used to measure certain criteria for elimination of false branches (340). The skeleton is then smoothed and more accurately centered (350). Finally, direction vectors are assigned to each point in the tree structure (360) to allow derived renderings such as unrolled views, perpendicular and parallel planes and endoscopic views inside the vessel tree.

Depending on the results of the vessel segmentation, the vessel tree may comprise one or more connected components. Thus, root sites for each individual component should be selected. It is to be understood that locations closest to the patient's heart are typically good choices for root sites. An exemplary result of the tree-fitting step is shown in image (b) of FIG. 5. More specifically, in image (b), the tree-model is fit to the tree structure of image (a) of FIG. 5. As shown in image (b), the thick, dark central lines 520-540 represent the tree model, which are then used to identify branches along with their hierarchy.

In particular, the resulting model describes the vessel tree as a series of connected branches where each branch is defined as a set of points along the center axis. Once this model is obtained, the individual branches can be presented in a hierarchical order, indicating, for example, a parent/child relationship between branches. This presentation enables the avoidance of navigational issues faced by 3D visualization methods because the branches may be scanned systematically.

Figure 5:
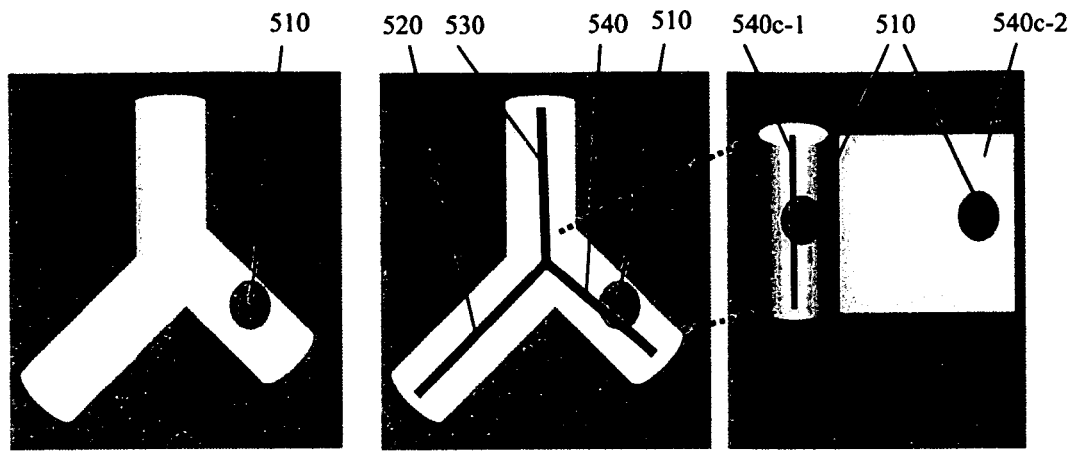
FIG. 5 is a series of diagrams illustrating the method for tree-model visualization for pulmonary embolism detection according to an exemplary embodiment of the present invention.
Figure 5:
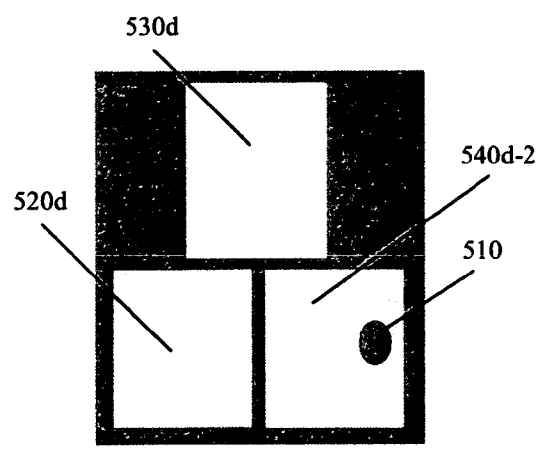

Referring back to FIG. 2, before each branch is presented in a hierarchical order, it is converted into a 2D representation as illustrated by the examples in image (c) of FIG. 5 (240). In one technique, a branch may be presented in a hierarchical order by unrolling the branch 540 as shown by 540c-2 in image (c). In this method, rays are cast in a circular fashion perpendicular to the branch direction for each individual site within the branch. A function of the voxels along the ray specifies the color for that specific ray. The color results for each ray are then stacked horizontally on a per-pixel basis to form a 2D image for presentation as shown by 540d-2 in image (d) of FIG. 5 (250). Instead of unrolling a branch, it can be represented as a projection of its inner contents, as shown by 540c-1 in image (c) of FIG. 5. An example of this will be described later.

As shown in image (d), once this 2D representation is presented to a user of, for example the system 100, the user only needs to view a single 2D image. Once presented to the user, the user may click on points in the 2D images 520d-540d-2 of image (d) via a user interface and the points may then be indicated in a corresponding 3D display or axial slice for further interpretation and verification.

Referring back to step 240, it is to be understood that several additional methods for converting each branch of the tree-model into a 2D image may be used in accordance with the present invention. The methods may include any type of function or functions that take a path through a 3D tube-like structure and presents the path as a 2D image to a user for viewing.

Figure 6:
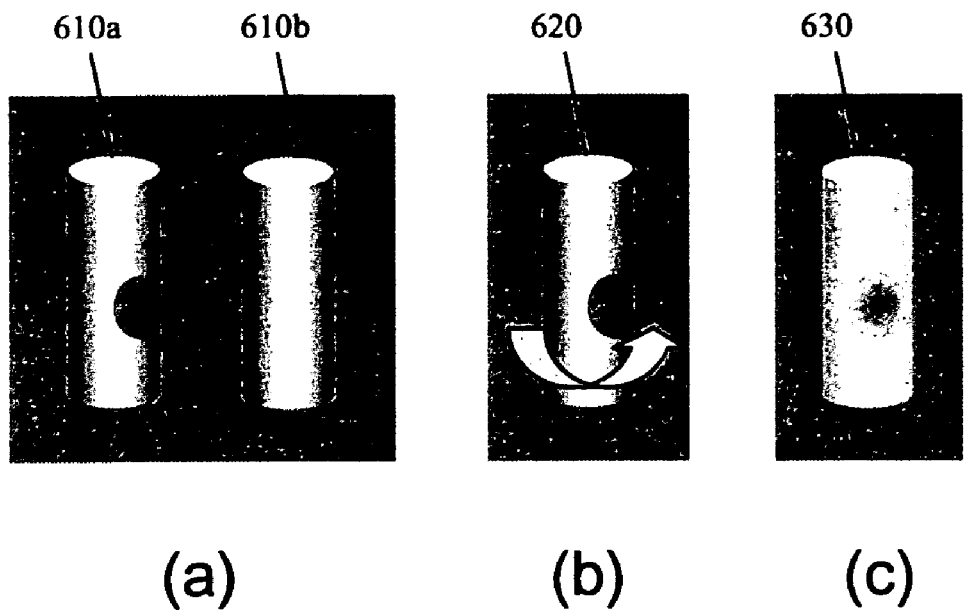
FIG. 6 is a series of diagrams illustrating alternative techniques for converting a 3D branch into a 2D image according to an exemplary embodiment of the present invention.

In one alternative method for converting each branch of the tree-model to a single 2D image, image (a) of FIG. 6 illustrates two renderings 610a and 610b of branches being displayed side-by-side with one rendering obtained from the "front" 610a and the other from the "back" 610b. This technique enables a full view around the branches to be observed. This rendering can also be done by performing a surface shading of the inner regions as evidenced by image (a) of FIG. 6.

In another method, illustrated in image (b) of FIG. 6, each branch can be illustrated as a rotating structure 620 within an animated 2D image, thus allowing visualization of all sides without distortion. Again, this rendering can be done by performing a surface shading of the inner regions as evidenced by image (a) of FIG. 6 or through a projection of the data. In yet another method, a 2D MIP limited to the voxels within the segmentation can be computed as shown by 630 in image (c) of FIG. 6. This technique allows for all of the voxels within the vessel to influence the view, thus allowing for visualization of features inside the vessel and eliminating the need to compute paths from the centerline to the surface.

Figure 7:
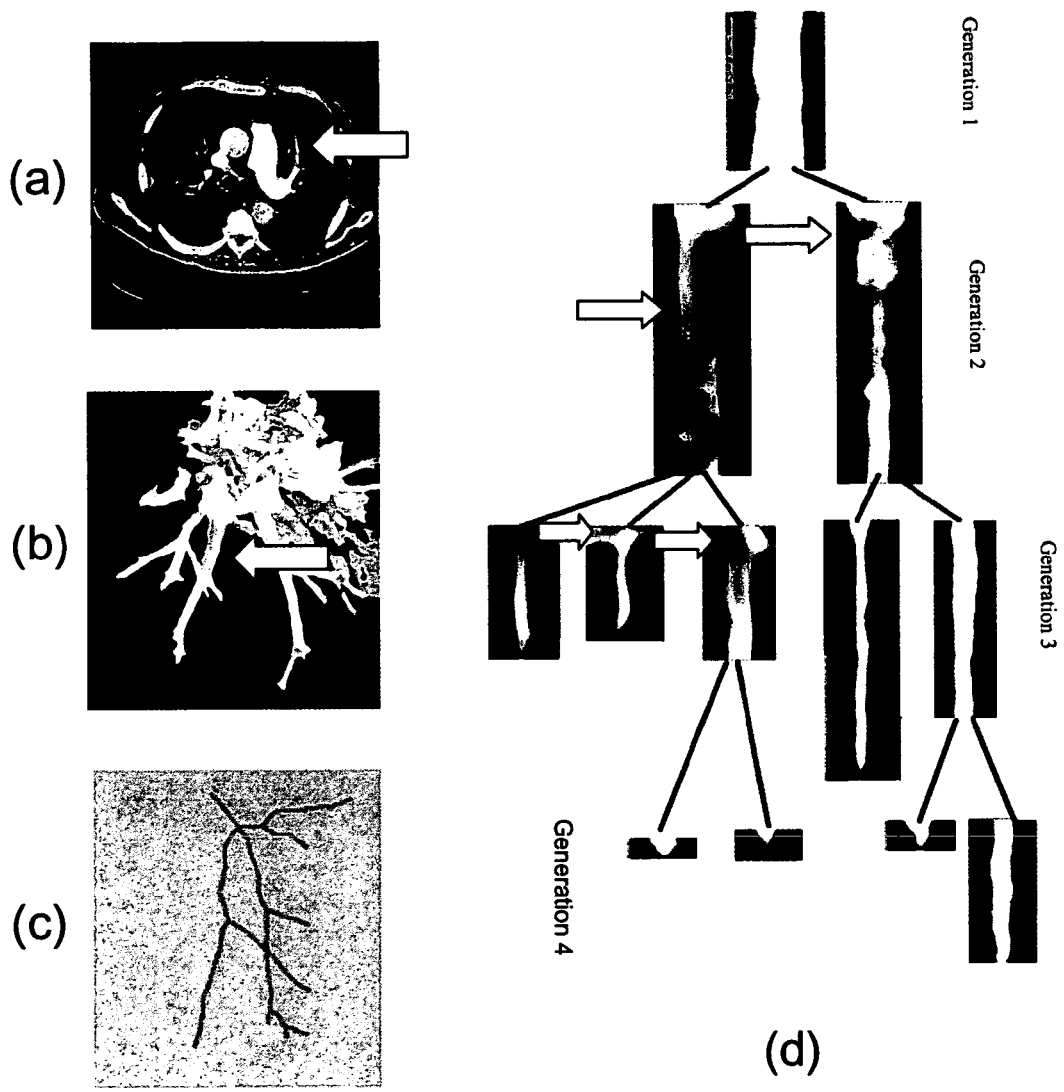
FIG. 7 is a series of images illustrating the results of converting a pulmonary vessel tree into a single 2D image according to an exemplary embodiment of the present invention.

FIG. 7 is included to illustrate the process and results of converting the vessel tree into a single 2D image. In image (a) of FIG. 7, an axial slice with an arrow indicating a PE is shown. In image (b) of FIG. 7, a visualization of a 3D pulmonary vessel tree is shown. The arrow in image (b) indicates the root of the sub-tree to be shown in image (c) of FIG. 7. In image (c) the computed tree-model for a portion of the vessel tree in image (b) is shown and in image (d) of FIG. 7 the final 2D visualization of the vessel tree from image (c) is shown. In image (d), only a sub-tree is illustrated because the entire tree is too large to be shown within one printed page. As can be observed from a review of image (d) the dark areas indicating clots or PEs (indicated by the arrows) are clearly visible as is the hierarchical relationship of the arteries (e.g., Generations 1-4). In addition, the extent of the clots is also determinable from this view.

Thus, in accordance with an exemplary embodiment of the present invention a method for representing vessels contained in a 3D CT image of the chest within a single 2D image for purposes of PE visualization is provided. In particular, the method first computes a tree-model for all vessel tree structures. Once this model is obtained, the individual branches thereof are presented in a hierarchical order. This enables a full view of all sides of the vessels while preserving the hierarchical structure of the tree. In addition, each branch can be displayed as a rotating structure or flattened into a 2D image. In the latter scheme, the need for 3D navigation is eliminated. Further, the representation schemes of the present invention allow a medical practitioner to click on a location and find its corresponding position in both the original CT data and 3D visualization further enhancing the diagnosis and detection of PE.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for tree-model visualization for detecting an abnormality in an anatomical tree structure, comprising:
   fitting a tree-model to a three-dimensional (3D) image of a segmented anatomical tree structure, said fitting further comprising the steps of:
      defining a root site for the anatomical tree structure;
      computing a skeleton of the segmented anatomical tree structure;
      forming a raw tree-structure using the skeleton;
      eliminating false branches in the raw tree-structure;
      smoothing and centering the skeleton; and
      assigning direction vectors to points in the segmented anatomical tree structure;
   converting each branch of the tree-model into a two-dimensional (2D) branch image; and
   forming a 2D image that presents the 2D branch images.

2. The method of claim 1, wherein the anatomical tree structure is segmented by using one of a thresholding and size-based labeling, line-filter based or structure tensor-based segmentation technique.

3. The method of claim 1, wherein the tree-model is fit by using one of a vessel-based tracking technique, skeletonization, distance transform or level-set based tree-model computation technique.

4. The method of claim 1, wherein the branches of the tree-model are converted into the 2D branch images by using one of an unrolling, side-by-side display, rotating structure or 2D maximum intensity projection technique.

5. The method of claim 1, wherein the anatomical tree structure is one of a vessel tree or airway tree.

6. The method of claim 1, wherein the anatomical tree structure is acquired using one of a computed tomography or magnetic resonance imaging technique.

7. The method of claim 1, wherein the abnormality is one of a pulmonary embolism, airway stenosis or brain aneurysm.

8. A computer readable medium tangibly embodying a program of instructions executable by a processor to perform method steps for tree-model visualization to detect an abnormality in an anatomical tree structure, the method steps comprising:
   fitting a tree-model to a three-dimensional (3D) image of a segmented anatomical tree structure, said fitting further comprising the steps of:
      defining a root site for the anatomical tree structure;
      computing a skeleton of the segmented anatomical tree structure;
      forming a raw tree-structure using the skeleton;
      eliminating false branches in the raw tree-structure;
      smoothing and centering the skeleton; and
      assigning direction vectors to points in the segmented anatomical tree structure;
   converting each branch of the tree-model into a two-dimensional (2D) branch image; and
   forming a 2D image that presents the 2D branch images.

9. The method of claim 8, further comprising:
displaying the 2D image that presents the 2D branch images in a hierarchical order.

10. The method of claim 9, further comprising:
observing branches in the 2D image that presents the 2D branch images in a hierarchical order.

11. The method of claim 10, further comprising:
receiving a branch selection; and
obtaining an original axial view of image data of the branch or 3D rendering of the branch.

12. The method of claim 11, wherein when the selected branch includes an abnormality, the abnormality is one of a pulmonary embolism, airway stenosis or brain aneurysm.

13. A system for tree-model visualization for detecting an abnormality in an anatomical tree structure, comprising:
   a memory device for storing a program;
   a processor in communication with the memory device, the processor operative with the program to:
   fit a tree-model to a three-dimensional (3D) image of a segmented anatomical tree structure, the fitting further comprising the steps of:
      define a root site for the anatomical tree structure;
      compute a skeleton of the segmented anatomical tree structure;
      form a raw tree-structure using the skeleton;
      eliminate false branches in the raw tree-structure;
      smooth and center the skeleton; and
      assign direction vectors to points in the segmented anatomical tree structure;
      convert each branch of the tree-model into a two-dimensional (2D) branch image; and
      form a 2D image that presents the 2D branch images.

14. The system of claim 13, wherein the anatomical tree structure is segmented by using one of a thresholding and size-based labeling, line-filter based or structure tensor-based segmentation technique.

15. The system of claim 13, wherein the tree-model is fit by using one of a vessel-based tracking technique, skeletonization, distance transform or level-set based tree-model computation technique.

16. The system of claim 13, wherein the branches of the tree-model are converted into the 2D branch images by using one of an unrolling, side-by-side display, rotating structure or 2D maximum intensity projection technique.

17. The system of claim 13, wherein the anatomical tree structure is one of a vessel tree or airway tree.

18. The system of claim 13, wherein the anatomical tree structure is acquired using one of a computed tomography or magnetic resonance imaging device.

19. The system of claim 13, wherein the abnormality is one of a pulmonary embolism, airway stenosis or brain aneurysm.

* * * * *